May 8, 1956        R. LUCIEN        2,744,699
CONTROL SYSTEM FOR AIRCRAFT WHEEL BRAKES AND THE LIKE
Filed Dec. 12, 1952        4 Sheets-Sheet 1
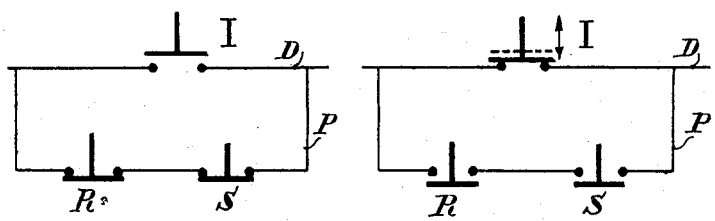
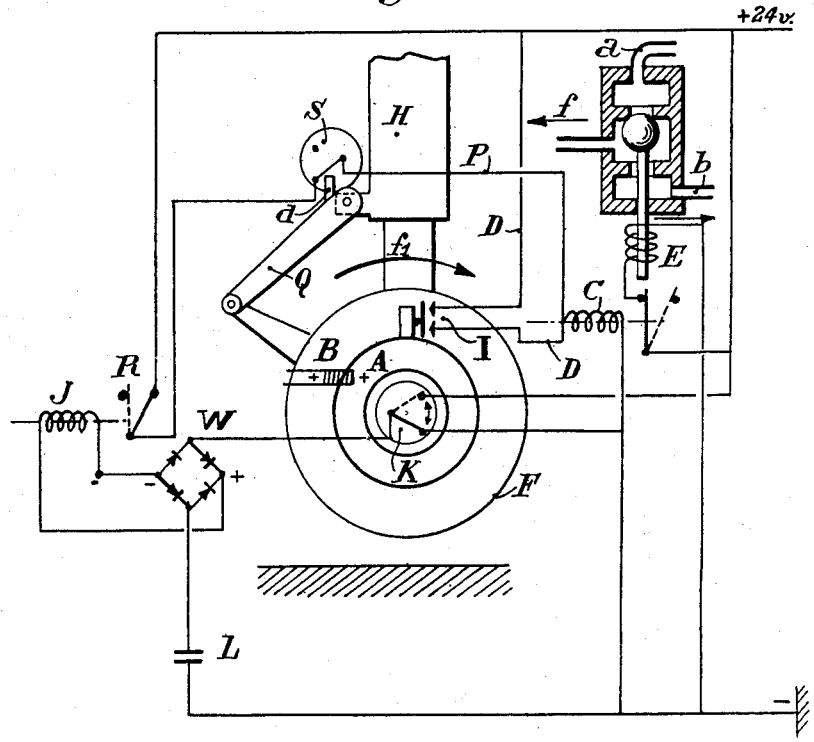
INVENTOR
RENE LUCIEN
BY Hazeltine, Lake & Co.
AGENTS

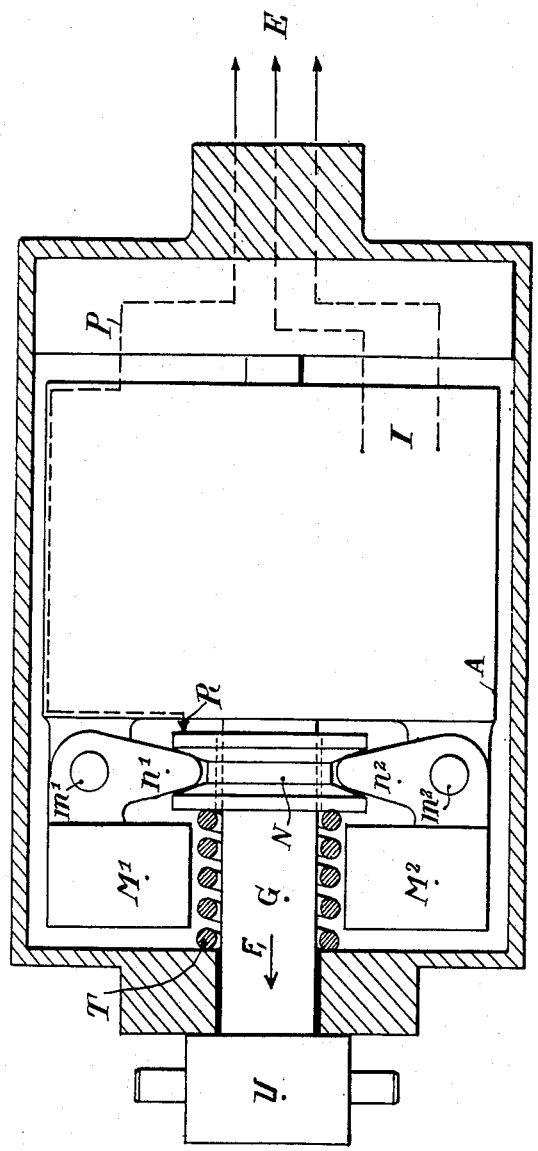

May 8, 1956  R. LUCIEN  2,744,699
CONTROL SYSTEM FOR AIRCRAFT WHEEL BRAKES AND THE LIKE
Filed Dec. 12, 1952  4 Sheets-Sheet 3

INVENTOR
RENE LUCIEN
BY Haseltine, Lake & Co.
AGENTS

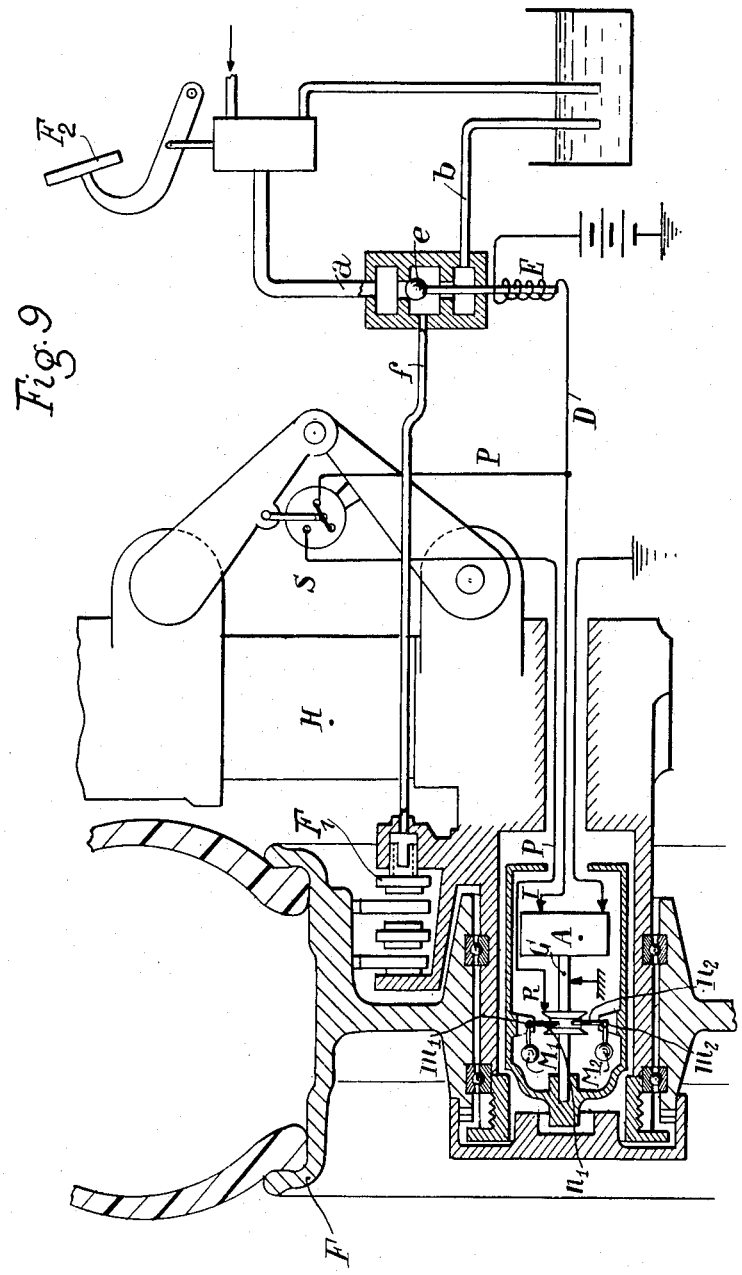

United States Patent Office 2,744,699
Patented May 8, 1956

2,744,699

CONTROL SYSTEM FOR AIRCRAFT WHEEL BRAKES AND THE LIKE

René Lucien, Paris, France, assignor to Societe d'Inventions Aeronautiques et Mecaniques S. I. A. M., Fribourg, Switzerland, a corporation of Switzerland Application December 12, 1952, Serial No. 325,504

Claims priority, application France July 15, 1952

12 Claims. (Cl. 244—111)

The present invention relates to wheel braking systems, and more particularly to braking systems, preferably of the hydraulic type, for aircraft wheels, although the general principle thereof is applicable to all vehicle wheels.

In systems designed to ensure by inertia effects the control of the braking of aircraft wheels, to prevent them from skidding on the ground, the deceleration of the wheel, when it reaches a certain value corresponding to incipient slip, actuates a brake release which reduces the braking effect; then, when deceleration decreases, the braking effort is again increased but will be reduced if the wheel tends to start skidding again, and so on.

This method, which ensures a theoretically automatic control of the braking when taxiing along the ground, may prove deficient and even cause serious accidents in the following circumstances:

When a plane is landing, if a wheel is braked by the normal pilot-operated brake control with a couple greater than that at which skidding occurs, the system of inertia control comes into action and causes the release of the brake and the wheel immediately resumes normal rolling owing to its contact with the ground. If, however, the wheel leaves the ground as a result of the plane rebounding, the ground frictional force tending to keep the wheel rolling in accordance with the speed of the aircraft disappears, and therefore, in spite of the brake release control, the wheel is rapidly slowed down by the braking action. Although the brake may not be in action when the wheel leaves the ground, owing to previous operation of the inertia control device, it will soon come into action and rapid deceleration of the wheel through braking thereafter will again bring about brake release, so that the brake application may be only momentary; nevertheless such a momentary brake application will frequently suffice to bring the wheel to a standstill in its unloaded condition. Consequently, if the rebound is prolonged, the wheel is braked to a stop, and since once the wheel has stopped there is no more deceleration, the safety device becomes inoperative and the brake remains fully applied. This is a dangerous state which can result in bad skidding and possibly a blow out when the wheel retouches the ground.

The object of the present invention is to remove this deficiency in brake control systems depending on inertia effects.

It consists essentially in arranging in shunt across the electrical brake-release circuit, which is controlled by the inertia effect, a contactor which is connected to the wheel to be braked, in such a way that it automatically closes the brake-release circuit as soon as the wheel stops rotating, and regardless of the value or direction of the inertia effect at the moment in question, whereby braking of the wheel when stopped is prevented.

In practice the connection between the wheel and the contactor may consist, for example, either of a tachometric dynamo, or of relatively-rotating sliding contacts which alternately charge and discharge a capacitor, or which modulate a direct current which is passed through the primary winding of a transformer to generate a secondary current.

It should be noted that the presence of this contactor, which causes the brake release as soon as the wheel stops turning, would prevent the plane from being halted completely by braking when it was parked. To avoid this disadvantage, the brake-control system according to the invention preferably further comprises a second contactor arranged in series with the first contactor in the shunt line of the brake release circuit, and connected to the suspension of the aircraft in such a way that it closes when the springs or the like are slack (wheel in the air) and opens when they are compressed under load (wheel on the ground).

The three characteristic states of the system according to the invention are shown diagrammatically in Figures 1, 2 and 3 of the accompanying drawing.

Figure 4 is a general arrangement diagram of a system according to the invention shown by way of example.

Figure 5 shows a simplified device with centrifugal action for the control of the contactor that closes the brake release circuit when the wheel is at a standstill or rotates with a reduced speed.

Figure 6:
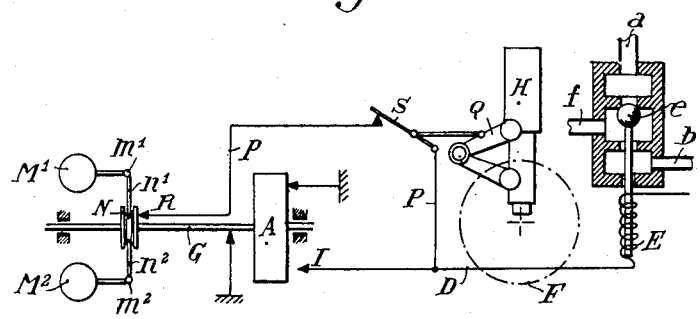
Figure 7:
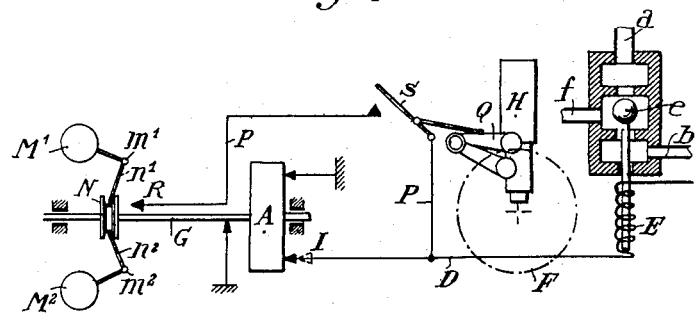
Figure 8:
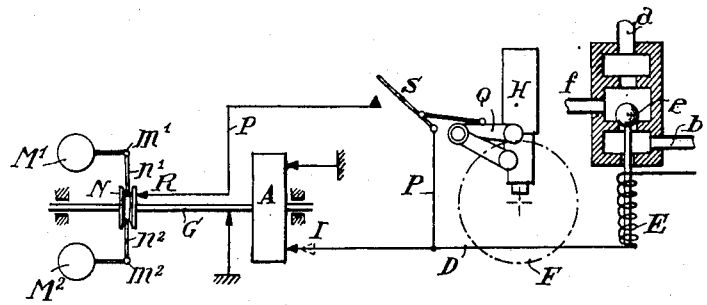

Figures 6, 7 and 8 respectively show, for the three characteristic states of the system, the corresponding wiring diagram for the control system of Fig. 5.

Figure 9 shows a complete wheel brake and suspension system according to Figures 5 to 8.

In Figures 1 to 3 the acceleration responsive device which is the source of the inertia effect and which transforms this effect into brake-release impulses, and alternatively of braking impulses is not represented because it may be of any known type either acting by single commutation or generating itself a current. In every case the function of this inertia device is to close a contactor I, called herein the inertia contactor, in an electrical circuit D controlling the brake release as soon as the deceleration of the wheel reaches a certain value. In the case of fluid-pressure operated brakes, when this brake release circuit is closed, it actuates, in a manner known, per se, an electro-magnetic spill valve putting the brake pressure line into communication with the fluid reservoir when its relay is energized, which is the equivalent of releasing the brake.

According to the invention there is arranged in a shunt line P of the brake-release circuit D, a contactor R, known as the rotation contactor, which is controlled by a device responsive to the rotation of the wheel to be braked, in such a way that it is closed when the wheel stops (Figures 1 and 3) and opens when the wheel is turning (Figure 2).

In the same shunt line P, there may also be arranged in series with the contactor R, another contactor S, known as the suspension contactor, which is controlled by a device responsive to load on the suspension of the wheel in such a way that it is closed when the resilient parts of the suspension are slack (Figure 1) and open when they are compressed (Figures 2 and 3).

It will be seen that the system according to the invention thus satisfies the following conditions:

1. If the wheel is stopped in the air (springs slack), its braking is prevented since the rotation contactor R and the suspension contactor S in the shunt path P are both closed (Figure 1) and energizing current is supplied to the relay of the spill valve.

2. If the wheel is turning on the ground or in the air, it can be braked, subject, of course, to the control of the inertia device to counteract skidding, since the suspension and rotation contactors are open (Figure 2).

3. If the wheel is motionless on the ground (aircraft parked-springs compressed) the inertia contactor I and suspension contactor S are both open and consequently braking is possible (Figure 3).

In Figure 4, which illustrates, by way of example, the assembly of a brake control system incorporating the three contactors I, R, S, in the state described above with reference to Figure 1, the inertia device comprises, in a manner known per se, a fly-wheel A. This fly-wheel, which rotates freely on the axle of the wheel F to be braked, turning in the direction indicated by the arrow $f_1$, is subject to the return action of a spring B. When the deceleration of the wheel, as a result of braking, reaches a predetermined value, the flywheel A overruns the wheel F, against the action of the spring B, to a sufficient extent to close the contactor I in the circuit D, which has the effect of energizing the skid-control relay C (position in full lines in Figure 4). The electro-magnetic spill valve E is thus activated and brings the brake pipe $f$, connected to the wheel brake (not illustrated), into communication with the return line $b$ to the reservoir, and also cuts off the brake pressure feed line $a$ from the pipe $f$.

According to the invention, the contactors R and S are incorporated in this known system. The contactor R is governed by a relay J, connected by a bridge rectifier W to a condenser L which is alternately charged and discharged by a commutator or impulse switch K, mounted on the axle of the wheel F, so that these alternations are governed by the rotation of the wheel.

The contactor S is connected to the wheel suspension in this example, by means of a pin $d$ rigidly attached to one of the arms Q of the usual compass linkage connecting the cylinder H of the shock-absorber to the wheel axle.

The system therefore operates as follows:

If the wheel is stopped in the air, the relay J has no current running through it because the capacitor L is either charged or discharged but is not receiving any alternation. Consequently the contactor R occupies the closed position, illustrated in full line in Figure 4, and since the contactor S is also closed because it is not actuated by the pin $d$, the relay C has current running through it which causes the release of the brake by the electro-magnetic spill valve E.

It should be noted that with this safeguard the aircraft can land without any danger of skidding or blow-out even if the pilot-operated brake-control is in the braking position before touching down.

If the wheel is both rotating and in contact with the ground, the contactors R and S are both open, the latter under the action of the pin $d$, the springs being compressed; the brake may therefore be applied under the control of the inertia device comprising the fly-wheel A and contactor I.

If the wheel is stopped on the ground, the contactor R is closed but, as the contactors S and I are open, the relay C is not energized and braking is possible.

Figure 5 shows another embodiment of the control of the wheel rotation contactor which is particularly simple and avoids the use of the electric equipment for its strictly mechanical working rests on a centrifugal effect.

According to that embodiment, one or several weights driven in rotation by the rotating part of the wheel are each linked on one of the arms of a lever the other arm of which closes said contactor either directly or through the intermediary of a slide as soon as the speed of the wheel falls under a certain limit value which practically is very near to a standstill.

The two centrifugal weights $M^1$ and $M^2$, in the embodiment described, rotate on axles $m^1$—$m^2$ carried by a body $A^1$ which may be the casing of the acceleration responsive device of the braking control proper. Said body $A^1$ is driven in rotation by a clutch U through a shaft G integral with the rotating part of the wheel. The ends of the lever arms $n^1$—$n^2$ opposed to the weights are engaged with the groove of a pulley N which is slidably arranged on the shaft G and which is pressed by a spring T on the contact R (provided with the same reference number as hereinbefore) as long as the wheel is turning at a speed less than the chosen limit value for which the spring T is calibrated. Beyond said limit value, the centrifugal effect of the weights drives the pulley N into the direction of the arrow $F^1$ against the action of the spring T, which opens the contact R and consequently opens the shunt line P on the brake release circuit D and allows the braking action under the control of the contactor I of the acceleration responsive device A.

The diagrams of Figures 6 to 8 show the simplicity of the embodiments described, from the electrical point of view as well as from the mechanical one.

In Figure 6, one assumes that the wheel is turning at a speed less than the very reduced limit value, for instance when the wheel is stopped in the air (not being in contact with the ground).

In said instance, the inertia contactor I is open but the contactor R is closed and so is the contactor S (shock absorber H slack, linkage Q open), so that the braking release circuit D, closed by its shunt P, energizes the electro-magnet of the spill valve E; the armature lifts up the ball $e$ and connects the braking pipe $f$ with the return line $b$ towards the reservoir.

In Figure 7, it is assumed that the wheel is turning on the ground, at a speed higher than that of said limit value: as a result, the brake release circuit is opened at the same time at R by the centrifugal weights and at S (shock absorber H compressed, linkage Q closed) so that the braking is possible nevertheless with the control of the acceleration responsive device A that alternately closes the inertia contact (brake release when skidding occurs) or opens said contactor (braking).

The same would occur if during a rebounding the wheel were turning not in contact with the ground, but in the air at a speed higher than that of said limit value, for the brake release circuit, closed at S would be still open at R.

In Figure 8 one assumes that the wheel is at a standstill (contactor R closed) and in contact with the ground (contactor S opened) which corresponds notably to the parked position. In this instance, as in the preceding one, braking can occur to run-up the power plant.

In Figure 9, there is shown a complete brake system comprising a wheel F having a brake $F_1$ of the disc type built into its hub. The brake $F_1$ may be applied to the wheel F by actuation of a pilot-operated brake control member or pedal $F_2$ over a hydraulic circuit comprising a pressure line $a$, a brake line $f$ and a return line $b$. In the hydraulic circuit, there is included an electromagnetic spill valve having a valve member $e$ and an actuating relay E. The electrical circuit supplying energizing current to the relay E includes the inertia switch I actuated by the acceleration responsive device A, and the shunt circuit by-passing the switch I includes in series the suspension switch S controlled by the wheel suspension H and Q and rotation switch R as previously described.

With both switches R and S closed the relay E is energized and actuation of the pedal $F_2$ has no effect on the brake $F_1$. With one or both of switches R and S open, the brake can be applied by actuating the pedal only if the switch I is open, i. e. with wheels rotating in mid-air or stopped on the ground.

I claim:

1. In a hydraulic braking system for aircraft wheels and the like, the combination with a wheel to be braked mounted on a telescopic shock-absorbing strut having a compass connecting the upper part of the strut to the wheel hub, a brake for the wheel and a pilot-operated brake-control member, of a braking circuit controlled by the brake-control member and communicating with a source of pressure fluid and with the brake, an electro-magnetically actuated valve adapted to connect the braking circuit to exhaust to release the brake, an electrical energizing circuit for the valve, an acceleration responsive device mounted coaxially with the wheel and operative by inertia to close and open a switch inserted in the energizing circuit, a shunt circuit by-passing the switch, at least one weight rotatably driven by the wheel, a pivot pin for the weight, a bell-crank lever on the pin having a first arm carrying the weight and a second arm directed radially of the wheel, an actuator slidable axially of the wheel and engaged by the second arm, a first switch inserted in the shunt circuit and operable by the actuator, a spring urging the actuator in a direction to close the first switch until the centrifugal force caused by rotation of the weight with the wheel reaches a value predetermined by the spring, a second switch in the shunt circuit in series with the first, and a mechanical connection between the compass and the second switch to close the latter with the telescopic strut extended and to open it with the strut collapsed.

2. In a wheel braking system, the combination with a wheel, a suspension for the wheel, a brake for the wheel, and a selectively operable brake-actuating member, of a brake mechanism controlled by the brake-actuating member, an electrically actuated brake release member normally inoperative to render the brake mechanism inactive, a main electrical circuit controlling the release member and including a first switch inserted therein to close the circuit and, energize the release member and render the brake mechanism inactive, means controlling the first switch including an inertia member responsive to variations in the speed of rotation of the wheel, a shunt circuit by-passing the first switch and including a second and a third switches inserted in series therein, means controlling the second switch responsive to instantaneous speed of rotation of the wheel, and means controlling the third switch responsive to loading of the suspension.

3. A wheel braking system according to claim 2 wherein the second switch is normally closed and the means controlling the second switch is operative to open the said switch with the speed of rotation of the wheel at a predetermined value.

4. A wheel braking system according to claim 3 wherein the means controlling the third switch is operative to close the said switch with the suspension unloaded and to open it with the suspension loaded.

5. A wheel braking system according to claim 2 wherein the means controlling the third switch is operative to close the said switch with the suspension unloaded and to open it with the suspension loaded.

6. A wheel braking system according to claim 2 wherein the means controlling the first switch is operative to open the said switch with the inertia member rotating at most at the same speed as the wheel and to close it with the wheel decelerating with respect to the inertia member.

7. A wheel braking system according to claim 6 wherein the second switch is normally closed and the means controlling the second switch is operative to open the said switch with the speed of rotation of the wheel at a predetermined value.

8. A wheel braking system according to claim 6 wherein the means controlling the third switch is operative to close the said switch with the suspension unloaded and to open it with the suspension loaded.

9. In combination with a wheel braking system, an anti-skid device operative to render the braking system inactive thereby to prevent a locked wheel condition, and a speed responsive device operative to render the system inactive over a predetermined speed range of the wheel at which the anti-skid device is inoperative.

10. In combination with a wheel braking system, a control member operative to deactivate the system and prevent application of the brakes, an electrical control circuit to actuate the control member and render it inoperative with the circuit open, an anti-skid device including a control switch in the circuit operative automatically to close the control circuit and prevent a locked wheel condition, and a speed responsive device including a shunt circuit by-passing the switch to close the control circuit over a predetermined speed range of the wheel and render the control member operative with the anti-skid device inoperative.

11. The combination as in claim 9 with a device responsive to wheel loading operative to render the system active with the anti-skid and speed responsive systems inoperative.

12. The combination as in claim 10 with a device responsive to wheel loading including a further switch in the shunt circuit to open the control circuit and render the control member inoperative with the wheel at rest.

References Cited in the file of this patent

UNITED STATES PATENTS

| | | |
|---|---|---|
| 2,347,847 | Schell | May 2, 1944 |
| 2,444,927 | Gallagher | July 13, 1948 |
| 2,477,881 | King | Aug. 2, 1949 |
| 2,502,110 | Trevaskis | Mar. 28, 1950 |
| 2,529,985 | Williams | Nov. 14, 1950 |
| 2,621,002 | Pittman | Dec. 9, 1952 |
| 2,631,696 | Yarber | Mar. 17, 1953 |
| 2,636,700 | Yarber et al. | Apr. 28, 1953 |
| 2,656,017 | Trevaskis | Oct. 20, 1953 |
| 2,663,521 | Yarber | Dec. 21, 1953 |